Feb. 14, 1933.  R. PAWLIKOWSKI  1,897,819
INTERNAL COMBUSTION ENGINE FOR LIQUID AND SOLID FUELS
Filed Nov. 26, 1928    2 Sheets-Sheet 1
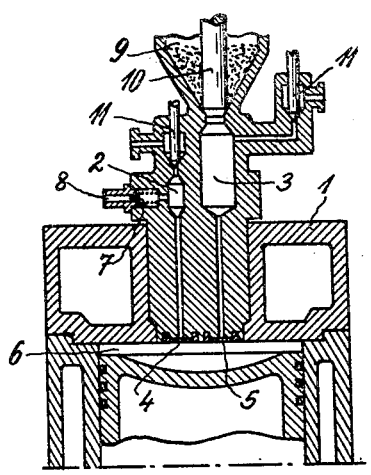
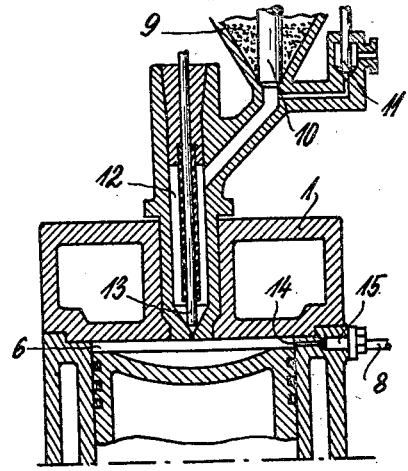
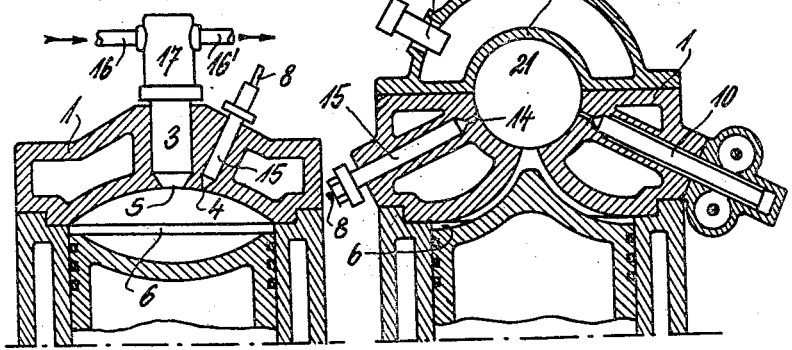
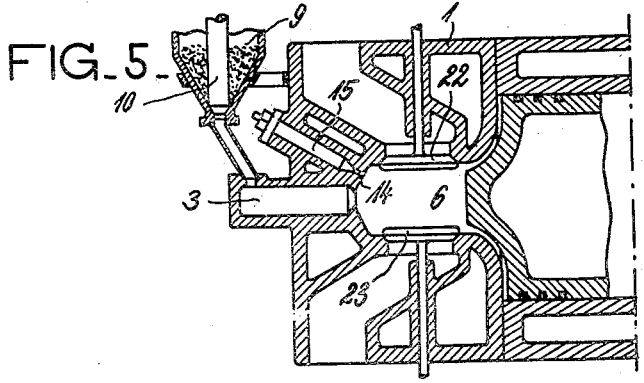

Feb. 14, 1933. R. PAWLIKOWSKI 1,897,819
INTERNAL COMBUSTION ENGINE FOR LIQUID AND SOLID FUELS
Filed Nov. 26, 1928 2 Sheets-Sheet 2
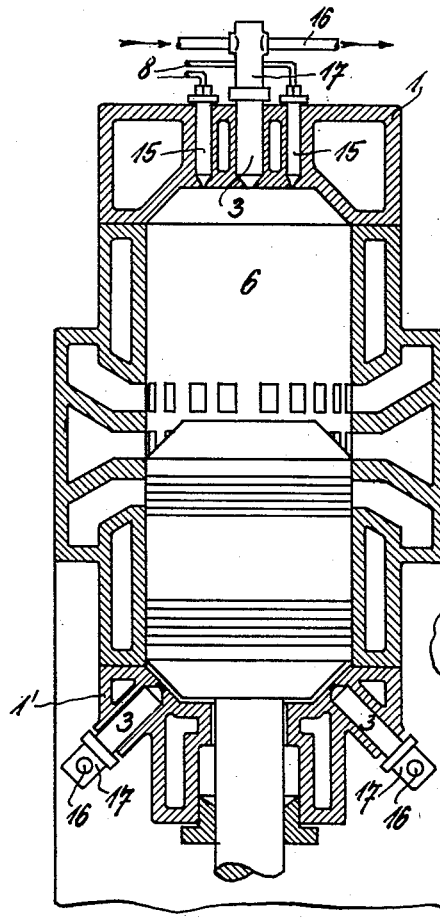
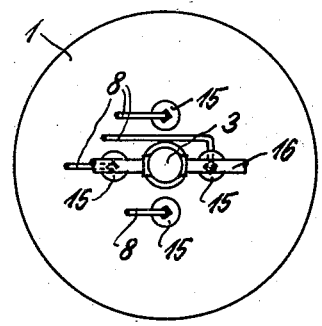
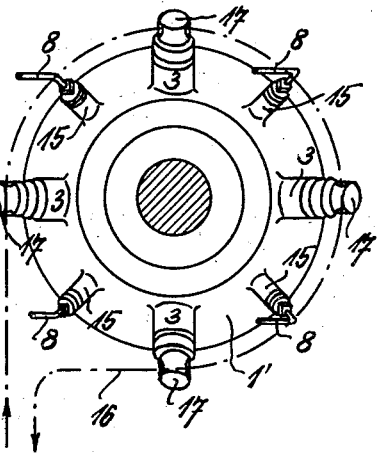
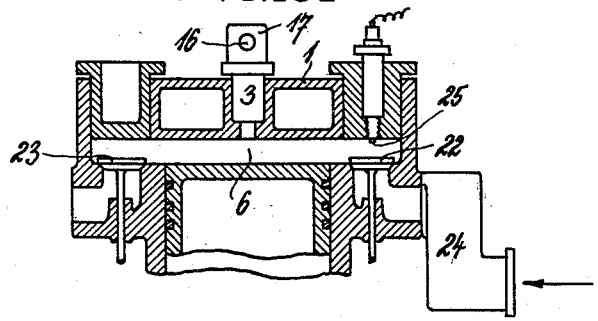

Patented Feb. 14, 1933

1,897,819

UNITED STATES PATENT OFFICE

RUDOLF PAWLIKOWSKI, OF GOERLITZ, GERMANY

INTERNAL COMBUSTION ENGINE FOR LIQUID AND SOLID FUELS

Application filed November 26, 1928, Serial No. 322,066, and in Germany May 19, 1927.

According to my invention, internal combustion engines working on the Diesel, hot bulb and other principles are equipped at the same time with one of the well known injection or blowing in devices for oil operation as well as one of the devices, also known heretofore, for pulverized coal propulsion. These internal combustion engines may be driven both with liquid as well as solid pulverized fuel, these fuels being used either separately or both together. As the iginition point may be controlled within certain limits by variously regulating the oil delivery and the blowing in of pulverized fuel and by other regulating expedients, it is possible, even with mixed working to so mutually influence the ignition of both fuel varieties that the most efficient indicator pressure diagram is obtained, whether working at constant pressure or with some rise of pressure beyond the compression pressure and the complete burning of the less combustible fuel with the aid of the other fuel during the available time given by an engine cycle may be brought about.

The two fuels may be delivered to the engines either in mutually parallel supply nozzles or according to the particular type of engine (e. g. vertical or horizontal, four stroke or two stroke, single or double acting, simple or multiple air-suction and exhaust valves, single or double piston engines etc.,) at any angle to each other. The jet injection in compressorless oil engines gives the constructor a free hand, in each case, to arrive at the most suitable mutual position of the two fuel delivery devices.

With slowly igniting powdered fuels such as anthracite, blast furnace coke and semi-distilled coke with few volatile products, moreover with damp fuel such as peat, wood powder, etc., it is of advantage to place the oil injection nozzle with its orifice in the region of the powdered fuel delivery point so that first of all a small oil flame is formed in the cylinder, in which even if only an infinitesimally small time after, the powdered fuel may be made to ignite instantly and rapidly burn away.

The introducing of the liquid propulsion oil may take place in the form of mist or vapour along with the suction air whilst according to the invention, the engine is provided at the same time with a supply device for solid pulverent fuel. Thus in this manner, automobile engines running on petrol, benzol or spirit with electric ignition for fluid fuel may be driven with pulverized coal and other kinds of powder. As a rule these explosion engines do not experience at the end of compression, that rise of temperature above the ignition temperature which is essential to produce during the short time available a rapid combustion of the pulverulent fuel admitted towards the end of compression. Thus in a very convenient manner the existing electric ignition of these petrol motors is utilized for igniting the powdered fuel by drawing in first of all a very weak mixture of propulsion oil, firing this electrically and then admitting the main driving fuel as a cheap powdered fuel into the preliminary flame so formed.

By means of the present invention existing automobiles can be adapted for propulsion with pulverized substances from coal or dried vegetable or animal products (e. g., pulverized locust swarms, powdered dried maize stalks, foliage, straw and other waste substances abounding plentifully and cheaply especially in tropical territories having little coal and oil resources).

The possibility of being able to run the powdered fuel at any time on liquid fuel gives a substantial advantage as the piston having become caked with a large amount of ash may be cleansed with a liberal oil supply for a time, and in case of emergency can be kept running on this fuel. As is well known, in the case of liquid fuel engines a more or less considerable portion of the admitted liquid fuel is deposited on the cylinder wall unburnt and is forced behind the piston rings with the ignition gases. Then it easily entrains a portion of the powdered fuel residues e. g. ash or unburnt portions of the powder and cleans the piston so that even in the most serious cases when the piston threatens to seize, the attendant can easily put the piston in running order again by changing over to oil propulsion for a short time.

Some examples showing how the invention may be applied will now be described in conjunction with the accompanying drawings.

In the device according to Fig. 1 two depositing chambers 2 and 3 for liquid and pulverulent fuel are arranged on the cylinder cover 1. The chambers 2 and 3 merge into two adjacent nozzles 4 and 5 in the working cylinder, 6. The oil chamber 2 is connected to the usual fuel pump (not shown) through the duct 8 provided with a check valve 7. The powder chamber 3 has placed in front of it a fuel storage container 9 from which it is charged with powdered fuel at intervals controlled by the filling valve 10. Both chambers 4 and 5 are provided with blowing-in valves 11. Both the oil chamber 2 as well as the powder chamber 3 thus contain all devices to permit the engine to be driven either with oil or powdered fuel alone. For instance when the engine is working with powdered fuel, the fuel oil pump to the chamber 2 and the air blowing valve 11 thereon may be shut off. It is possible however to maintain both chambers 2 and 3 in operation and to work with a liquid ignition substance and a pulverulent propelling substance. By suitably adjusting the setting of the two air inlet valves 11, the desired succession of the admission of oil and powdered fuel into the working cylinder 6, may be enforced.

In Fig. 2 the engine for pulverulent fuel has a closed nozzle 12 which is arranged in the cylinder cover 1 in the direction of the central axis of the cylinder. The powder storage container 9 is shut off from the nozzle chamber 12 again by the regulated filling valve 10. The charging of the nozzle chamber 12 with powdered fuel from the storage container 9 may be effected, every time the filling valve 10 opens, by means of a drop action. The conveying of the nozzle chamber charge into the working cylinder 6 is accomplished upon the opening of the admission nozzle valve 13 by means of the admission air supplied through the valve 11. The oil delivery device enters radially from the side at 14 direct into the working cylinder 6. It consists of a spraying valve 15, which under the pressure of the fuel pump (not shown), diffuses a jet into the cylinder at each working stroke. Thus with this device, it is possible to work either with pulverized fuel from the nozzle 12 or with direct oil injection at 14. Also a mixed propulsion of oil and powder is possible also.

According to Fig. 3 the admission devices for fluid and pulverulent fuel are inclined to each other, the two nozzle orifices 4 and 5 in the cylinder cover being close to each other. This arrangement is particularly advantageous because slow burning pulverulent fuels (e. g. coke, black coal etc.,) may readily be fired with an easily inflammable ignition oil. The fuel dust which is admitted into the working cylinder axially through the nozzle 5 passes direct into the flame of the oil jet injected at an angle from the nozzle 4 and rapidly and completely burns through in this ignition flame. The oil duct 8 leading from the fuel pump, is again connected to the oil nozzle 4. The pulverulent fuel is supplied in a main 16, 16' to a container 17 arranged on the cylinder cover 1 and by means of a blast or other conveying means, is continuously moved in the main 16, 16' at the container 17. A portion of the powder deposits itself in the container 17 from the conveying air current and during the suction stroke of the working piston, on account of the underpressure produced through the open mouth 5 in the ante-chamber 3 also, it passes into the latter if at the time the filling valve between the powder container 17 and the ante-chamber 3 is open.

Fig. 4 shows a hot bulb engine. The bulb 18 is warmed up at the start in the usual manner by a lamp 19 and when the engine is running it keeps itself sufficiently hot solely by the ignition heat without the lamp then being necessary as the dome 20 protects it from cooling off. The hot bulb chamber 21 is charged with some powdered fuel and conveying air through the filling valve 10, this being done preferably at the lower dead center. During the time of its deposit, lasting approximately up to the end of compression, the powder is preheated in the hot bulb 21 so far that the heat of compression—usually very slight—of the working air in the cylinder 6, is able to ignite the powdered fuel shortly before the upper dead center, provided that the hot bulb chamber 21 be properly proportioned. The hot bulb chamber 21 at 14 is run into by an oil injection valve 15 which may be actuated independently of the powder filling valve 10. In this case also it is possible to work the engine either with pulverized fuel alone or with oil or if need be with both kinds together.

Fig. 5 illustrates the invention applied to a horizontal engine. In the cylinder cover 1 there is arranged the air inlet valve 22, the exhaust valve 23, an ante-chamber 3 for the pulverized fuel and an oil injection valve 15.

Figs. 6 to 8 show a double acting two-stroke engine, Fig. 6 being a vertical section through the cylinder, Fig. 7 a plan on the upper cylinder cover and Fig. 8 a view from below on the lower cylinder cover. The admission nozzle 3 for the pulverized fuel is arranged in the upper cylinder cover centrally and in the direction of the longitudinal axis of the cylinder. The oil admission valves 15 which function compressorless with direct oil injection for instance are distributed around the powder nozzle 3. In the lower cylinder cover the powder nozzles 3 are inserted, distributed uniformly about the piston rod whilst the oil nozzles 15 are located in between. The main 16, serving to convey the mixture of coal dust and air, may be led past all powder nozzles 3 so that the depositing chamber 17 of all powder nozzles 3 are thus fed from one and the same main as will be seen from Fig. 8.

Also here the devices may be actuated so that the engine works either with pulverized fuel or oil alone or both together.

Fig. 9 represents a carburetor engine which, in addition to having the usual carburetor 24 also has a device 3 in the cylinder cover of any kind suitable for admitting pulverized fuel. If the machine is to operate solely with the carburetor, a combustible mixture is drawn through the carburetor 24 and the inlet valve 22 in the usual way and is ignited at the end of compression at the electric ignition point 25. Seeing that these explosion engines as a rule do not reach at the end of compression that degree of temperature necessary for a rapid firing of the pulverulent fuel which is only introduced into the cylinder towards the end of compression, the existing electric ignition 25 is made use of for igniting the fuel powder in an advantageous manner. Preferably a very weak mixture is drawn first of all through 24 and 22, this being ignited by the electric ignition flame 25 shortly before the end of compression and only then is the actual, much cheaper pulverized driving substance admitted into the preliminary flame through 3.

What I claim is:—

1. In an internal combustion engine for pulverized fuel, a working cylinder, a precombustion chamber connected to said working cylinder by an open pulverized fuel nozzle, a filling valve for admitting pulverized fuel into said precombustion chamber and means for blowing out the contents of said precombustion chamber into the working cylinder, a separate liquid fuel injecting nozzle near the said open pulverized fuel nozzle and a fuel injection pump for introducing the liquid fuel directly into the working cylinder.

2. In an internal combustion engine for pulverized fuel, a working cylinder, a precombustion chamber connected to said working cylinder by an open pulverized fuel nozzle, a filling valve for admitting pulverized fuel into said precombustion chamber, means for blowing out the contents of the precombustion chamber into the working cylinder, a separate nozzle for injecting liquid fuel into the working cylinder near the said open pulverized fuel nozzle and a fuel injection pump adapted to introduce the liquid fuel directly into the working cylinder before the pulverized fuel.

In witness whereof, I hereunto subscribe my name this 6th day of November A. D., 1928.

RUD. PAWLIKOWSKI.